United States Patent
Jeon et al.

(10) Patent No.: US 10,437,386 B2
(45) Date of Patent: Oct. 8, 2019

(54) DISPLAY PANEL HAVING TOUCH SENSOR AND INSPECTION METHOD

(71) Applicant: LG DISPLAY CO., LTD., Seoul (KR)

(72) Inventors: Kyunghyun Jeon, Paju-si (KR); Jaehoon Park, Goyang-si (KR); Jinho Lim, Goyang-si (KR); Cheolhwan Lee, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/246,163

(22) Filed: Aug. 24, 2016

(65) Prior Publication Data

US 2017/0060341 A1    Mar. 2, 2017

(30) Foreign Application Priority Data

Aug. 26, 2015  (KR) .................. 10-2015-0120230

(51) Int. Cl.
*G06F 3/041*  (2006.01)
*G06F 3/044*  (2006.01)
*G09G 3/00*   (2006.01)
*G09G 3/36*   (2006.01)

(52) U.S. Cl.
CPC ............ *G06F 3/0418* (2013.01); *G06F 3/044* (2013.01); *G09G 3/006* (2013.01); *G09G 3/3648* (2013.01); *G09G 3/3666* (2013.01)

(58) Field of Classification Search
CPC .... G06F 3/0418; G06F 3/044; G06F 11/2221; G06F 3/041; G01R 31/016; G01R 31/024; G01R 31/2825; G09G 3/20
See application file for complete search history.

(56) References Cited

U.S. PATENT DOCUMENTS

| | | | |
|---|---|---|---|
| 2015/0116261 A1 | 4/2015 | Ahn | |
| 2016/0328062 A1* | 11/2016 | Jin | G06F 3/0412 |
| 2016/0349917 A1* | 12/2016 | Bai | G02F 1/13 |
| 2016/0357333 A1* | 12/2016 | Huang | G06F 3/044 |
| 2016/0358525 A1* | 12/2016 | Huang | G09G 3/3655 |
| 2016/0364060 A1* | 12/2016 | Wang | G02F 1/1333 |
| 2016/0364068 A1* | 12/2016 | Cheng | G06F 3/0416 |
| 2017/0046003 A1* | 2/2017 | Huang | G06F 3/0418 |

FOREIGN PATENT DOCUMENTS

| | | |
|---|---|---|
| CN | 104516609 A | 4/2015 |
| CN | 104777637 A | 7/2015 |
| CN | 104793816 A | 7/2015 |

* cited by examiner

*Primary Examiner* — Kenneth Bukowski
(74) *Attorney, Agent, or Firm* — Seed Intellectual Property Law Group LLP

(57) ABSTRACT

A display panel having a touch sensor includes a pixel array, touch sensor blocks, a touch inspection pad unit, and an image inspection pad unit. In the pixel array, a plurality of pixels is disposed in a matrix form. The touch sensor blocks are connected to respective pluralities of the pixels in the pixel array. The touch inspection pad unit divides the touch sensor blocks into odd-numbered touch sensor blocks and even-numbered touch sensor blocks and a first touch inspection pad is coupled to the odd-numbered touch sensor blocks, while a second touch inspection pad is coupled to the odd-numbered touch sensor blocks. The image inspection pad part is commonly coupled to the odd-numbered touch sensor blocks and the even-numbered touch sensor blocks.

18 Claims, 6 Drawing Sheets

DISPLAY PANEL HAVING TOUCH SENSOR AND INSPECTION METHOD

This application claims the benefit of Korea Patent Application No. 10-2015-0120230 filed on Aug. 26, 2015, the entire contents of which is incorporated herein by reference for all purposes as if fully set forth herein.

BACKGROUND

Technical Field

The present disclosure relates to a display panel having a touch sensor and an inspection method thereof.

Description of the Related Art

Recently, the development of multimedia has lead to demand of display devices able to appropriately display multimedia, and in order to meet the demand, flat display devices (or display devices) which are increased in size and low-priced, and have high display quality (video expression, resolution, brightness, contrast, and color reproducibility, and the like) have been actively developed. In these flat display devices, various input devices such as a keyboard, a mouse, a track ball, a joystick, a digitizer, and the like, are used to form an interface between users and display devices. However, the use of the aforementioned input devices causes users to learn how to use the input devices and inconvenience such as installation and occupation of an operation space, making it difficult to increase completeness of products. Thus, demand for input devices which are convenient to use and simple and reduce malfunction has grown. In order to meet the demand, touch sensors capable of recognizing information generated as users directly touch a screen with their hands or a pen or apply a touch in a proximity manner, while viewing a display device, has been proposed.

Since touch sensors are simple, cause less malfunction, allow inputting without using a separate input device, and allow users to quickly and easily operate through contents displayed on a screen, touch sensors have been applied to various display devices.

A touch sensor installed in a display panel may be implemented as touch sensor block units connected to a plurality of pixels. The touch sensor blocks share a common electrode of pixels to use a common voltage as a sensing voltage. After a display panel having a touch sensor is completely manufactured, the display panel undergoes an inspection process to determine whether the display panel is defective or not. An open-short inspection for determining whether the touch block sensor is disconnected or not, as well as a pixel array inspection, should be performed on the display panel having a touch sensor. Here, in order to perform open-short inspection on the touch sensor blocks, a common voltage should be applied by touch sensor block unit, and thus, a related art lighting inspection method for inspecting pixel arrays is not appropriate. In addition, when a different voltage value is applied to each common electrode, accuracy of image inspection of the pixels is degraded.

BRIEF SUMMARY

According to an embodiment of the present disclosure, a display panel having a touch sensor may include: a pixel array, touch sensor blocks, a touch inspection pad part, and an image inspection pad part. Pixels may be disposed in a matrix form in the pixel array. The touch sensor blocks may be connected to the plurality of pixels, respectively. The touch inspection pad part may divide the touch sensor blocks into odd-numbered touch sensor blocks and even-numbered touch sensor blocks and be connected thereto. The image inspection pad part may be commonly connected to the odd-numbered touch sensor blocks and the even-numbered touch sensor blocks.

BRIEF DESCRIPTION OF THE SEVERAL VIEWS OF THE DRAWINGS

The accompanying drawings, which are included to provide a further understanding of the present disclosure and are incorporated in and constitute a part of this specification, illustrate embodiments of the disclosure and together with the description serve to explain the principles of the disclosure. In the drawings.

DETAILED DESCRIPTION

Figure 1:
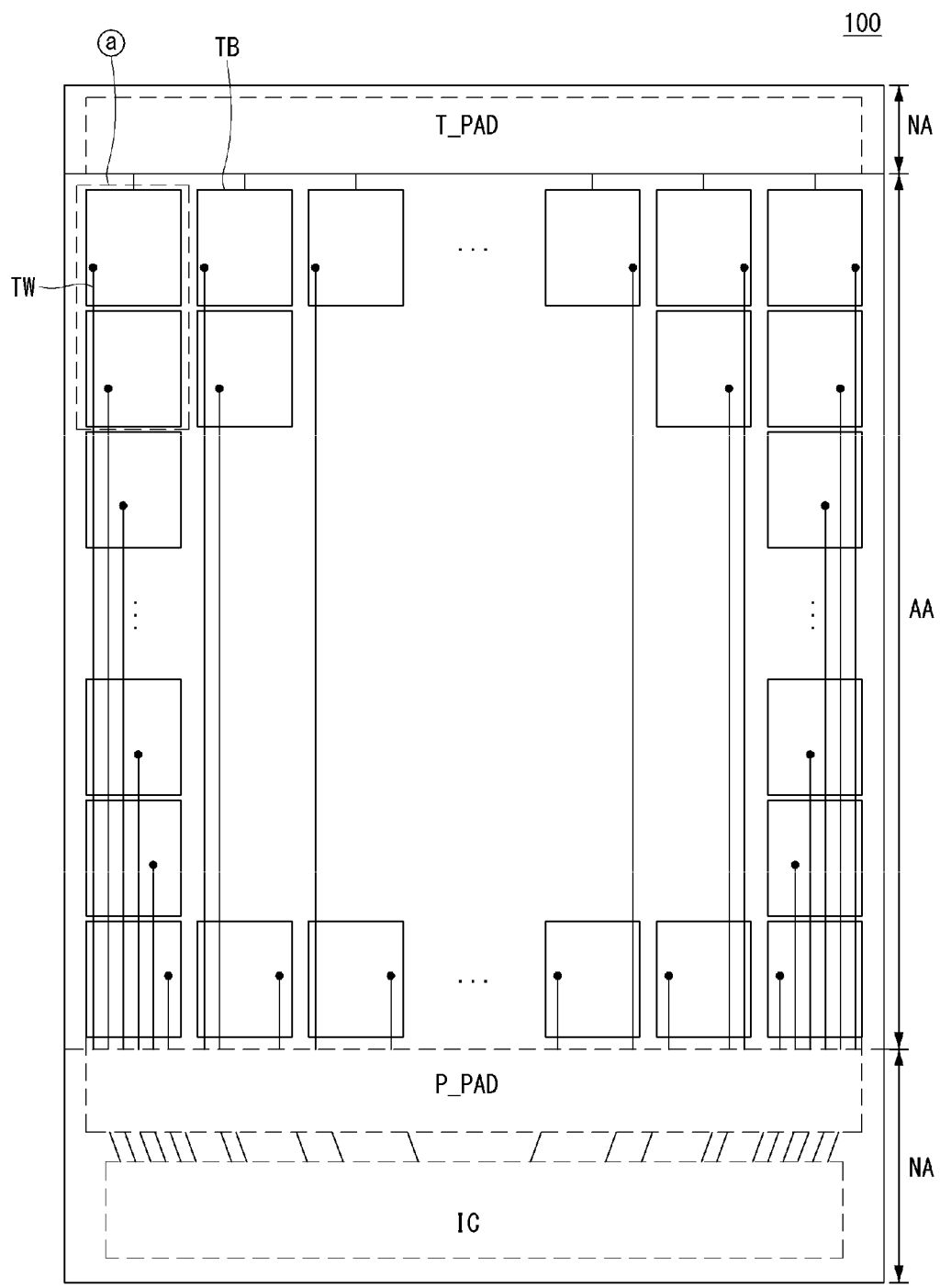
FIG. 1 is a view illustrating a display panel having a touch sensor according to an embodiment of the present disclosure.

Hereinafter, embodiments of the present disclosure will be described in detail with reference to the accompanying drawings. Throughout the specification, the like reference numerals denote the substantially same elements. In describing the present invention, if a detailed explanation for a related known function or construction is considered to unnecessarily divert the gist of the present invention, such explanation will be omitted but would be understood by those skilled in the art. Names of elements used in the following description are selected for the description purpose and may be different from those of actual products.

Figure 2:
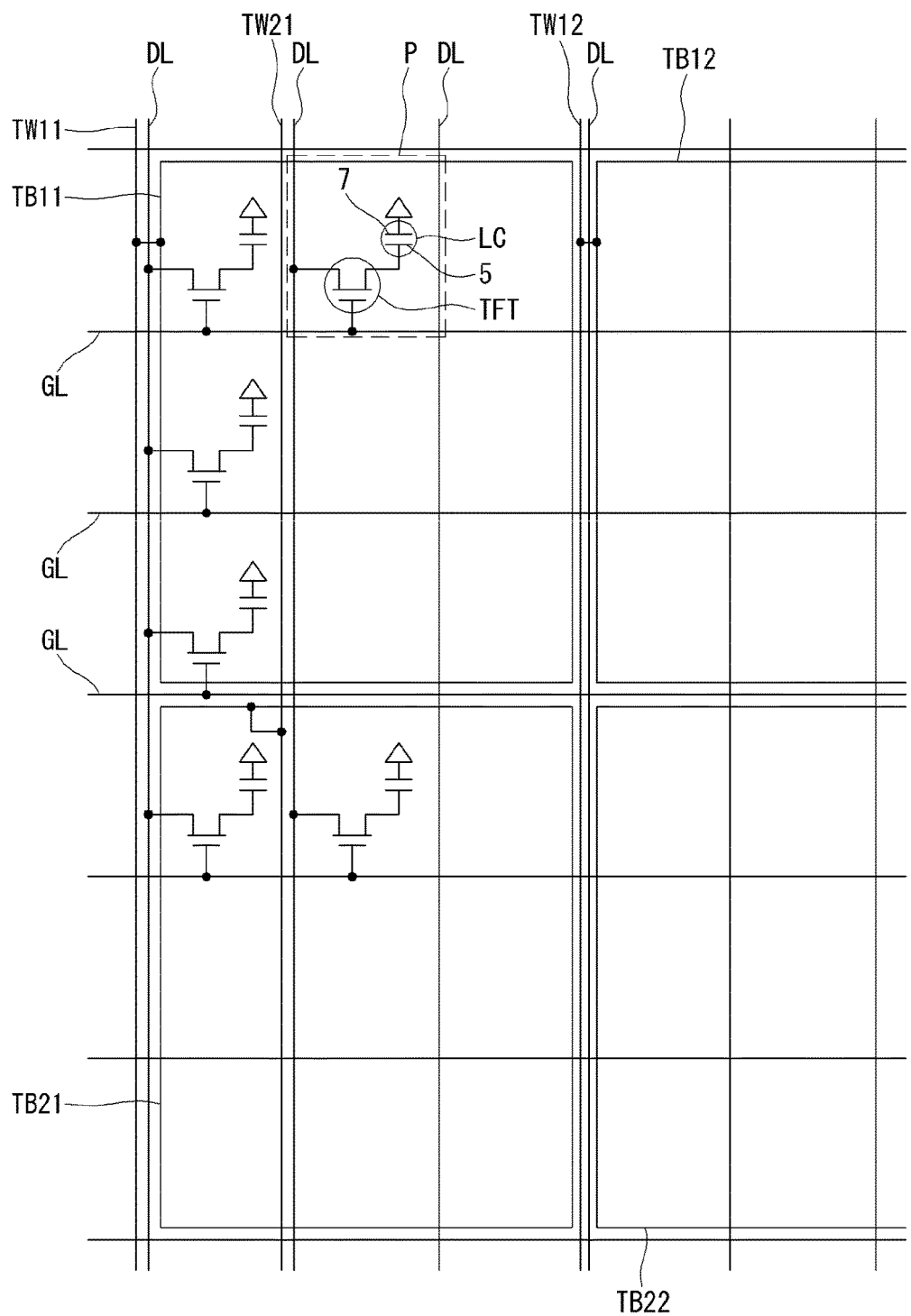
FIG. 2 is an enlarged view of a portion of the display unit illustrated in FIG. 1.

FIG. 1 is a view illustrating a display panel according to an embodiment of the present disclosure, and FIG. 2 is an equivalent circuit diagram of a touch sensor block of FIG. 1.

Referring to FIGS. 1 and 2, a display panel 100 including a touch sensor according to an embodiment of the present disclosure includes a display area AA and a non-display area NA. Pixels P for displaying image information and touch sensor blocks TBs are disposed in the display area AA. The non-display area NA is disposed outside the display area AA and includes various wirings, a touch inspection pad unit T_PAD and an image inspection pad unit P_PAD.

The display panel 100 includes an upper substrate and a lower substrate facing each other with a liquid crystal layer LC interposed therebetween.

A pixel array of the display panel 100 includes data lines DL and gate lines GL, and each pixel P of the pixel array may include a thin film transistor (TFT) (e.g., formed at an intersection of the respective data lines DL and gate lines GL), a pixel electrode 5 coupled to the TFT, a storage capacitor coupled to the pixel electrode 5, and the like. The TFT is turned on in response to a gate pulse provided from the gate line GL. When the TFT is turned on, the TFT supplies a data voltage applied through the data line DL to the pixel electrode 5. The liquid crystal layer LC is driven by a voltage difference between a data voltage applied to the pixel electrode 5 and a common voltage Vcom applied to a common electrode 7 to adjust a quantity of transmitted light.

The touch sensor blocks TB are each coupled to a respective plurality of pixels and are implemented in a capacitive manner to sense a touch input. Each of the touch sensor blocks TB may include several pixels P. FIG. 2 illustrates a case in which nine pixels P arranged in a 3×3 matrix form are allocated to one touch sensor block TB. In other embodiments, a different number and/or arrangement of pixels, such as a 2×2 matrix, 4×4 matrix or any other pixel arrangement, may be included in each touch sensor block TB. The touch sensor block TB senses a touch operation using the common voltage Vcom applied to the common electrode 7. The common electrode 7 is common to each pixel within a respective touch sensor block TB, and an area occupied by the common electrode 7 may be referred to as the touch sensor block TB. That is, the common electrode 7 is shared by all of the pixels in a touch sensor block TB, and each touch sensor block TB has a separate common electrode 7 that is unique that block TB. Each of the touch sensor blocks TB is coupled to a respective sensing line TW. For example, a sensing line TW11 in a first row and first column is coupled to a touch sensor block TB11 in the first row and first column, and a sensing line TW21 in a second row and first column is connected to the touch sensor block TB21 in the second row and the first column.

During a display period the common electrode 7 is distributed into the electrodes of in-cell touch sensors to supply the common voltage Vcom, a reference voltage, to the pixels of a respective touch sensor block TB, and during a touch sensing period, the common electrode 7 may be utilized as an electrode of an in-cell touch sensor (which may be, for example, a touch sensor block TB) and supply a sensing signal to the in-cell touch sensors during a touch sensing period.

The non-display area NA is disposed outside the display area AA and includes driving circuits for driving the data lines DL and the gate lines GL.

Also, the non-display area NA includes a touch inspection pad unit T_PAD for inspecting a touch sensor block TB and an image inspection pad unit P_PAD for inspecting an image of a pixel array. Also, the non-display area NA includes a region in which a driving device IC is to be installed.

When manufacturing of the display panel 100 is completed, the display panel 100 undergoes an inspection process to determine whether the display panel is defective or not. Inspection of the display panel 100 includes touch sensor block inspection and image inspection.

During the touch sensor block inspection, the display panel 100 is inspected to determine whether any of the touch sensor blocks TB are in an electrically open or shorted condition, and in particular, an open or shorted state of the common electrodes 7 disposed within the touch sensor blocks TB may be inspected. The image inspection is a process of determining whether the display area AA of the pixel array displays a normal image.

Figure 3:
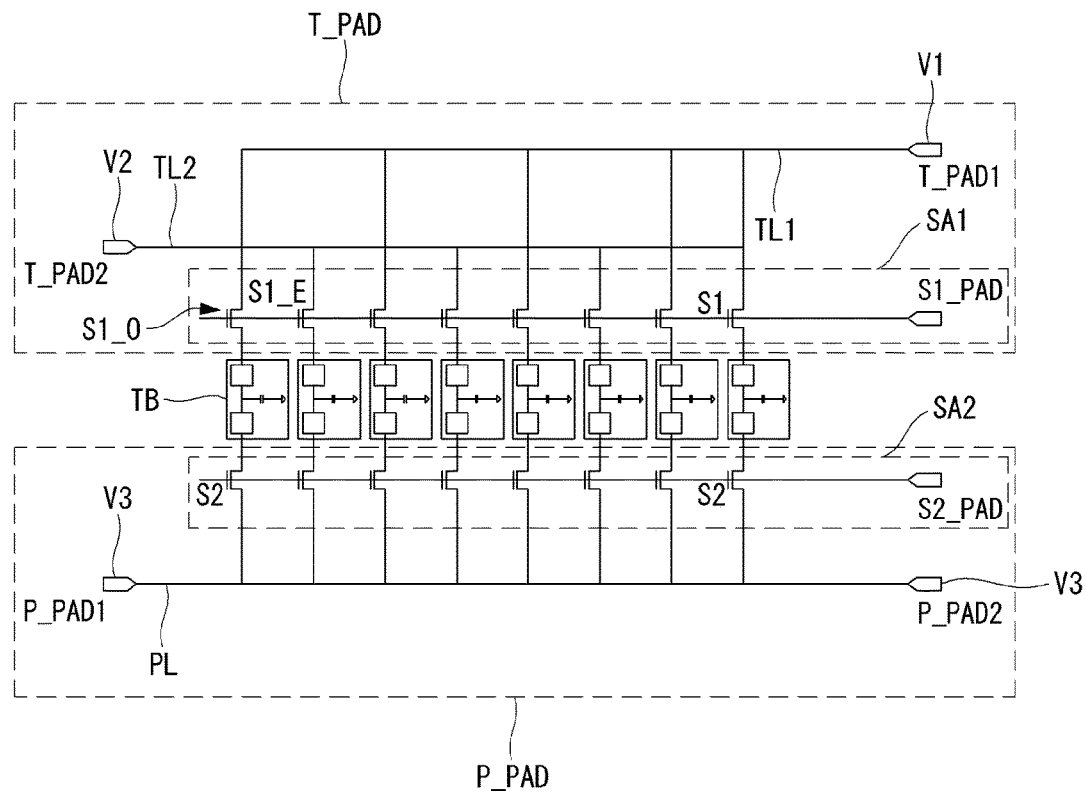
FIG. 3 is a schematic view illustrating a touch inspection pad unit and an image inspection pad unit.

In order to inspect the touch sensor block, the display panel 100 includes a touch inspection pad unit T_PAD as illustrated in FIG. 3. The touch inspection pad unit T_PAD includes a first touch inspection pad T_PAD1, a second touch inspection pad T_PAD2, and a first switch unit SA1. The first touch inspection pad T_PAD1 is coupled to a first plurality of touch sensor blocks TB (e.g., the odd-numbered touch sensor blocks TB across respective rows, such as the first, third, fifth, etc. touch sensor blocks TB in each respective row) through a first inspection line TL1. The second touch inspection pad T_PAD2 is coupled to a second plurality of touch sensor blocks (e.g., the even-numbered touch sensor blocks TB across respective rows, such as the second, fourth, sixth, etc. touch sensor blocks in each respective row) through a second inspection line TL2. The first inspection lines TL1 and the second inspection lines TL2 are coupled to one of sensing lines TW.

The first switch unit SA1 includes a plurality of first switches S1 and a touch inspection signal input pad S1_PAD. The first switches S1 couple the first touch inspection pad T_PAD1 to the first plurality of touch sensor blocks (e.g., odd-numbered switches S1_O couple the first touch inspection pad T_PAD1 to respective odd-numbered touch sensor blocks) and couple the second touch inspection pad T_PAD2 to the second plurality of touch sensor blocks (e.g., even-numbered switches S1_E couple the second touch inspection pad T_PAD2 to respective even-numbered touch sensor blocks), in response to a touch inspection signal provided, for example, via the touch inspection signal input pad S1_PAD.

In order to inspect an image, the display panel 100 includes an image inspection pad unit P_PAD. The image inspection pad unit P_PAD includes a first image inspection pad P_PAD1, a second image inspection pad P_PAD2, and a second switch unit SA2. The first image inspection pad P_PAD1 and the second image inspection pad P_PAD2 are coupled to all of the touch sensor blocks TB (e.g., the odd-numbered and even-numbered touch sensor blocks) through a third inspection line PL. The second switch unit SA2 includes a plurality of second switches S2 and an image inspection signal input pad S2_PAD. The second switches S2 couple the first and second image inspection pads P_PAD1 and P_PAD2 and all the touch sensor blocks TB in a row direction, namely, a horizontal direction.

The touch sensor block inspection and the image inspection are separately performed.

Inspection of the touch sensor blocks of the touch panel according to an embodiment of the present disclosure will be described.

During a touch sensor block inspection period, the touch inspection pad unit T_PAD receives inspection voltages V1, V2 through a jig (not shown). The first touch inspection pad T_PAD1 receives a first inspection voltage V1 through the jig and the second touch inspection pad T_PAD2 receives a second inspection voltage V2 through the jig. The first and second inspection voltages V1, V2 may be set to have different voltage levels. For example, the first inspection voltage V1 may be set as a common voltage having a positive polarity, and the second inspection voltage V2 may be set as a common voltage having a negative polarity.

During the touch sensor block inspection period, the first switch unit SA1 is turned on by a touch inspection signal provided, for example, via the touch inspection signal input pad S1_PAD. As a result, the first inspection voltage V1 applied to the first touch inspection pad T_PAD1 is applied to odd-numbered touch sensor blocks TB11, TB13, etc. through an odd-numbered switch S1_O of the first switch unit SA1, and the second inspection voltage V2 applied to the second touch inspection pad T_PAD2 is applied to even-numbered touch sensor blocks TB12, TB14, etc. through an even-numbered switch S1_E of the first switch unit SA1.

During the touch sensor block inspection period, a data voltage is charged in each pixel P. To this end, in the pixel P, the gate line GL receives a gate pulse through a gate pad (not shown) and the data line DL receives a data voltage through a data pad (not shown). The gate pad and the data pad may be any known pad used for inspecting lighting of the display panel. When the TFT is turned on by a gate pulse, the data voltage applied to the data line is charged in the pixel electrode 5. As a result, the liquid crystal cell LC allows light to be transmitted therethrough in response to a voltage difference between the pixel electrode 5 and the common electrode 7.

Figure 4:
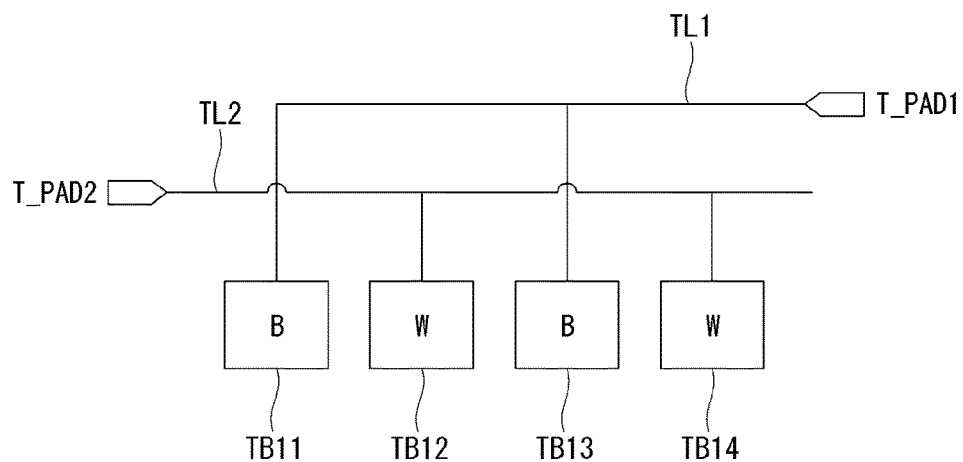
FIGS. 4 and 5 are views illustrating examples of a touch sensor block inspection process for inspecting touch sensor blocks in a row direction.

During the touch sensor block inspection period, the display panel displays brightness in units of the touch sensor blocks TBs. FIG. 4 is a view illustrating a portion of a row of touch sensor blocks TB during the touch sensor block inspection process. FIG. 4 illustrates an example in which, in a normal state, odd-numbered touch sensor blocks TBs display a black image and even-numbered touch sensor blocks TBs display a white image.

Figure 5:
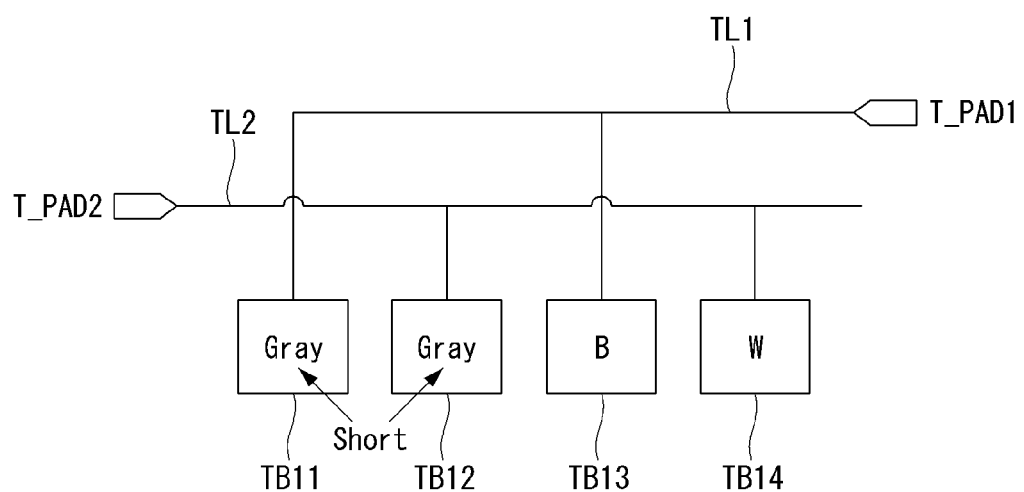

When the touch sensor blocks TBs are defective, an image displayed by the touch sensor blocks TBs is changed. For example, as illustrated in FIG. 5, when a short circuit defect occurs between a common electrode of the first odd-numbered touch sensor block TB11 and a common electrode of the first even-numbered touch sensor block TB12, a first inspection voltage V1 applied to the first odd-numbered touch sensor block TB11 and a second inspection voltage V2 applied to the first even-numbered touch sensor block TB12 are charge-shared. As a result, the first odd-numbered touch sensor block TB11 and the first even-numbered touch sensor block TB12 display an image corresponding to a middle gray level between the black image B and the white image W.

Meanwhile, an error (e.g., an open circuit) may occur in the touch sensor blocks with sensing lineTW. In order to determine whether the touch sensor blocks TBs with sensing line TW are open, the common voltage applied to each of the touch sensor blocks TBs is swung in voltage level after the lapse of a predetermined period of time. For example, the first inspection voltage V1 which has been applied to the odd-numbered touch sensor blocks TB11, TB13, TB21 and TB23 is swung to the second inspection voltage V2, and the second inspection voltage V2 which has been applied to the even-numbered touch sensor blocks TB12, TB14, TB22, and TB24 is swung to the first inspection voltage V1. As a result, the image displayed on the odd-numbered touch sensor blocks TB11, TB13, TB21, and TB23 and the image displayed on the even-numbered touch sensor blocks TB12, TB14, TB22, and TB24 are reversed with respect to each other.

Figure 6:
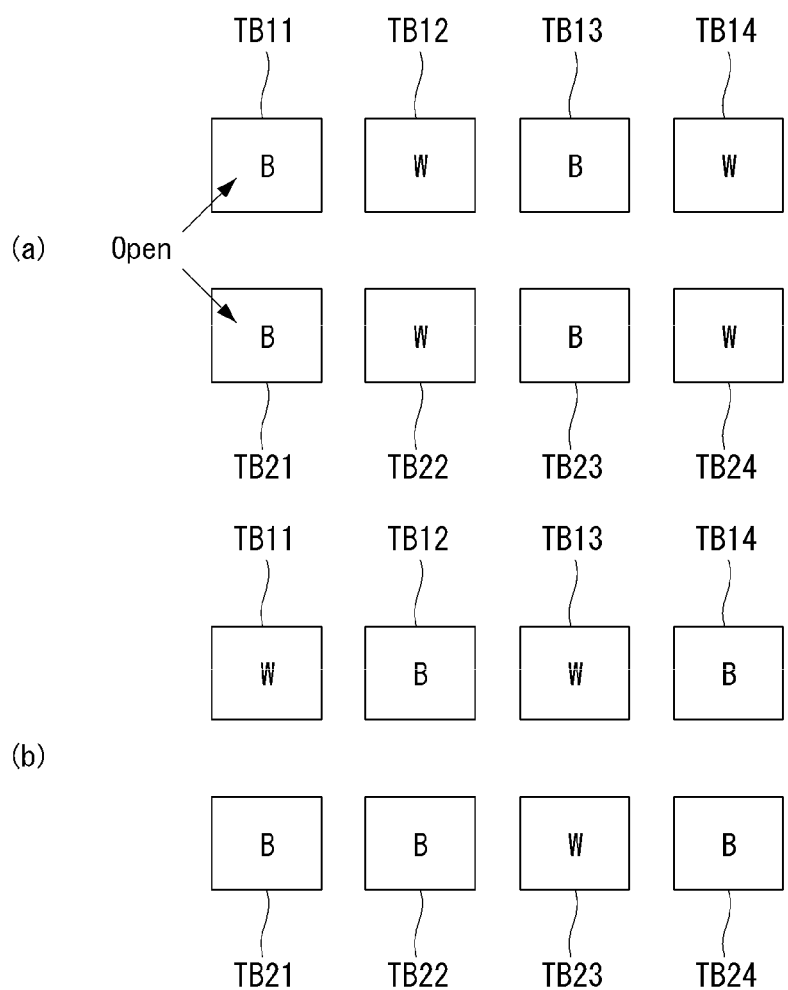
FIGS. 6 and 7 are views illustrating examples of a touch sensor block inspection process for inspecting touch sensor blocks in a column direction.

However, if the common electrode and sensing line TW are open, the common voltage applied to a touch sensor block TB at a rear stage (e.g., TB21, as shown in FIG. 6(*b*)) is not changed in a black voltage level. As a result, as illustrated in (b) of FIG. 6, while the image of the odd-numbered touch sensor block TB11 in the first row is reversed from the black image to a white image, the image of the odd-numbered touch sensor block TB21 in the second row is maintained as the black image. In this manner, whether the common electrodes 7 of the touch sensor block TB and sensing line are open may be determined on the basis of whether the image is changed.

In this manner, whether the touch sensor blocks are open or shorted may be determined simply by applying a separate common voltage (e.g., respective first and second inspection voltages V1, V2) to the odd-numbered touch sensor blocks and even-numbered touch sensor blocks.

A method for inspecting an image of a touch panel according to an embodiment of the present disclosure will be described.

Image inspection is a process of determining whether the display area AA displays a desired image by writing a predetermined data pattern into a pixel array. To this end, during an image inspection period, a common voltage (e.g., a third inspection voltage V3) having the same voltage level is applied to all the pixels P, and a data voltage applied to each of the pixels P is varied according to image patterns.

Figure 7:
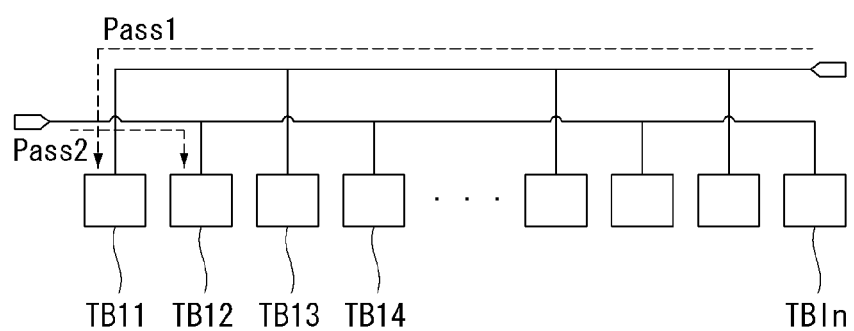

In order to accurately determine an image displayed on pixels, a common voltage having the same magnitude should be applied to all the common electrodes 7, and here, if the common voltage is applied through the touch inspection pad part T_PAD, there occurs a difference in delay of the common voltage due to a difference in path along which the common voltage is applied. For example, as illustrated in FIG. 7, although the first odd-numbered touch sensor block TB11 and the first even-numbered touch sensor block TB12 are disposed to be adjacent to each other, but a first path pass1 along which the first odd-numbered touch sensor block TB11 receives the common voltage is longer than a second path pass2 along which the first even-numbered touch sensor block TB12 receives the common voltage. Thus, even though the common voltage having the same magnitude is applied to the first touch inspection pad T_PAD1 and the second touch inspection pad T_PAD2, the common voltage applied to the first odd-numbered touch sensor block TB11 and the common voltage applied to the first even-numbered touch sensor block TB12 are different. Thus, even when the same image should be displayed on the first odd-numbered touch sensor block TB11 and the first even-numbered touch sensor block TB12, a different image is displayed due to the variation in the common voltage. In particular, when a middle gray level between a black image and a white image is displayed, a significant difference is made in brightness of a displayed image even with a small difference in common voltage. In this case, even though the pixel array substrate and the common electrodes 7 are normal (i.e., non-defective), the device may be determined to be defective during the image inspection.

Thus, in order to reduce the difference in delay of the common voltage applied to the touch sensor blocks TB, in the image inspection according to an embodiment of the present disclosure, a common voltage is received using the image inspection pad part P_PAD, as shown for example in FIG. 3.

During an image inspection period, the second switch unit SA2 is turned on by an image inspection signal provided, for example, from the image inspection signal input pad S2_PAD. As a result, a common voltage (e.g., a third inspection voltage V3) applied to the first and second image inspection pads P_PAD1 and P_PAD2 is applied to each of the touch sensor blocks TB through the switches of the second switch unit SA2. The first and second image inspection pads P_PAD1 and P_PAD2 are connected to each other and simultaneously apply a common voltage to the touch sensor blocks TBs from both ends of the display unit. Since the touch sensor blocks TBs receive the common voltage simultaneously applied from both ends of an image inspection line PL, a difference in the common voltage between adjacent touch sensor blocks TBs is negligible. Thus, during the image inspection period, a difference in brightness between the adjacent touch sensor blocks TBs due to a difference in delay of the common voltage may be improved. As a result, accuracy of the image inspection may be enhanced.

In this manner, in the display panel including the touch sensor according to an embodiment of the present disclosure, since the common voltage is applied by dividing the touch sensor blocks into odd-numbered columns and even-numbered columns for open-short inspection, whether there is an open or short condition between touch sensor blocks may be determined through a simple data pattern.

In addition, in the display panel including the touch sensor according to an embodiment of the present disclosure, since the same common voltage (e.g., the third inspection voltage V3) is applied to all the common electrodes using the image inspection pad part, accuracy of image inspection may be enhanced. Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A display panel having a touch sensor, the display panel comprising:
    a pixel array including a plurality of pixels disposed in a matrix form;
    a plurality of touch sensor blocks connected to the respective plurality of pixels;
    a touch inspection pad unit dividing the touch sensor blocks into odd-numbered touch sensor blocks and even-numbered touch sensor blocks and coupled thereto; and
    an image inspection pad unit commonly coupled to the odd-numbered touch sensor blocks and the even-numbered touch sensor blocks, the image inspection pad unit being separate from the touch inspection pad unit,
    wherein the touch inspection pad unit comprises:
        a first touch inspection pad receiving a first common voltage;
        a second touch inspection pad receiving a second common voltage; and
        a first switch unit coupling the first touch inspection pad and the odd-numbered touch sensor blocks and coupling the second touch inspection pad and the even-numbered touch sensor blocks, in response to a touch inspection signal,
    wherein the first and second common voltages have different voltage levels, and
    wherein the image inspection pad unit comprises:
        an image inspection line;
        a first image inspection pad connected to a first end of the image inspection line, the first inspection pad receives a third common voltage, and the third common voltage has a same voltage level as that of either the first common voltage or the second common voltage;
        a second image inspection pad connected to a second end of the image inspection line that is opposite the first end, the second image inspection pad receives the third common voltage; and
        a second switch unit supplying the third common voltage applied through the first and second image inspection pads to the odd-numbered touch sensor blocks and the even-numbered touch sensor blocks, in response to an image inspection signal.

2. The display panel of claim 1, wherein the touch inspection signal is applied to the first switch unit during a touch sensor block inspection period.

3. The display panel of claim 2, wherein the first common voltage and the second common voltage are maintained to have different voltage levels during the touch sensor block inspection period.

4. The display panel of claim 1, wherein the first touch inspection pad and the second touch inspection pad are spaced apart from one another by a predetermined distance in a direction in which the touch sensor blocks are arranged.

5. The display panel of claim 1, wherein the image inspection signal is applied to the second switch unit during a period for inspecting an image of the pixel array.

6. The display panel of claim 1, wherein the touch inspection pad unit is positioned adjacent to a first side of the display panel, and the image inspection pad unit is positioned adjacent to a second side of the display panel that is opposite the first side.

7. The display panel of claim 1, wherein the plurality of touch sensor blocks is positioned between the touch inspection pad unit and the image inspection pad unit.

8. The display panel of claim 1, wherein the second switch unit includes a plurality of odd-numbered switches and a plurality of even-numbered switches, each of the odd-numbered switches being coupled between the image inspection pad and a respective one of the odd-numbered touch sensor blocks, each of the even-numbered switches being coupled between the image inspection pad and a respective one of the even-numbered touch sensor blocks.

9. The display panel of claim 8, wherein each of the odd-numbered switches and each of the even-numbered switches includes a respective control terminal coupled to an image inspection signal input pad.

10. The display panel of claim 1, wherein the first switch unit includes a plurality of odd-numbered switches and a plurality of even-numbered switches, each of the odd-numbered switches being coupled between the first touch inspection pad and a respective one of the odd-numbered touch sensor blocks, each of the even-numbered switches being coupled between the touch inspection pad and a respective one of the even-numbered touch sensor blocks,
    wherein each of the odd-numbered switches and each of the even-numbered switches includes a respective control terminal coupled to a same touch inspection signal input pad.

11. A method for inspecting a display panel including a pixel array including pixels disposed in a matrix form and a plurality of touch sensor blocks coupled to respective pluralities of pixels of the pixel array, the method comprising:
    applying, by a touch inspection pad unit, a first common voltage to odd-numbered touch sensor blocks and applying, by the touch inspection pad unit, a second common voltage to even-numbered touch sensor blocks, during a touch sensor block inspection period;

applying the same data voltage to the pixels disposed in the odd-numbered touch sensor blocks and the even-numbered touch sensor blocks, during the touch sensor block inspection period;

applying the same common voltage to the touch sensor blocks during a pixel array inspection period;

applying a data voltage to each of the pixels disposed in the touch sensor blocks during the pixel array inspection period;

applying, by an image inspection pad unit that is separate from the touch sensor pad unit, a third voltage to the odd-numbered and even-numbered touch sensor blocks during the pixel array inspection period, the image inspection pad unit including an image inspection line and first and second image inspection pads respectively connected to opposite first and second ends of the image inspection line; and applying a second data voltage to each of the pixels of the pixel array during the pixel array inspection period, wherein the first and second common voltages have different voltage levels.

12. The method of claim 11, wherein the first and second common voltages are swung in voltage level in units of a predetermined period during the touch sensor block inspection period.

13. The method of claim 11, further comprising:
applying the second voltage to the odd-numbered touch sensor blocks and applying the first voltage to the even-numbered touch sensor blocks, after applying the first voltage to odd-numbered touch sensor blocks and applying the second voltage to even-numbered touch sensor blocks.

14. The method of claim 11, wherein applying the first voltage includes turning on a first plurality of switches, each of the first plurality of switches being coupled between the first voltage and a respective one of the odd-numbered touch sensor blocks, and wherein applying the second voltage includes turning on a second plurality of switches, each of the second plurality of switches being coupled between the second voltage and a respective one of the even-numbered touch sensor blocks.

15. The method of claim 14, wherein applying the third voltage includes turning on a third plurality of switches, each of the third plurality of switches being coupled between the image inspection line and a respective touch sensor block.

16. A device, comprising:
an array of pixels;
a first column of touch sensor blocks, each of the touch sensor blocks of the first column being coupled to a respective plurality of pixels of the array of pixels;
a second column of touch sensor blocks, each of the touch sensor blocks of the second column being coupled to a respective plurality of pixels of the array of pixels, the second column of touch sensor blocks being adjacent to the first column of touch sensor blocks;

first and second touch inspection pads configured to receive first and second inspection voltages, respectively;

a first switch coupled between the first touch inspection pad and each of the touch sensor blocks of the first column;

a second switch coupled between the second touch inspection pad and each of the touch sensor blocks of the second column, the first and second switches having respective control terminals coupled to one another and configured to receive a touch inspection signal, and in response, to supply the first inspection voltage to each of the touch sensor blocks of the first column, and to supply the second inspection voltage to each of the touch sensor blocks of the second column;

first and second image inspection pads configured to receive a third inspection voltage, the first and second image inspection pads being separate from the first touch inspection pad and from the second touch inspection pad;

an image inspection line having a first end connected to the first image inspection pad and a second end connected to the second image inspection pad; and a third switch coupled between the image inspection line and the first and second columns of touch sensor blocks, the third switch being configured to receive an image inspection signal, and in response, to supply the third inspection voltage to the first and second columns of touch sensor blocks, wherein the first inspection voltage has a first polarity and the second inspection voltage has a second polarity opposite the first polarity.

17. The device of claim 16, further comprising:
a third column of touch sensor blocks, each of the touch sensor blocks of the third column being coupled to a respective plurality of pixels of the array of pixels;
a fourth column of touch sensor blocks, each of the touch sensor blocks of the fourth column being coupled to a respective plurality of pixels of the array of pixels, the third column of touch sensor blocks being adjacent to the second column of touch sensor blocks, and the fourth column of touch sensor blocks being adjacent to the third column of touch sensor blocks;
a fourth switch coupled between the first touch inspection pad and each of the touch sensor blocks of the third column; and
a fifth switch coupled between the second touch inspection pad and each of the touch sensor blocks of the fourth column.

18. The display panel of claim 16, wherein the third inspection voltage has a same voltage level as that of either the first inspection voltage or the second inspection voltage.

* * * * *